United States Patent [19]

Hunt et al.

[11] Patent Number: 4,673,261

[45] Date of Patent: Jun. 16, 1987

[54] MOTION CONTROL APPARATUS FOR PRECISE REPEATABLE POSITIONING

[75] Inventors: Gary D. Hunt, Irvine; Helmut Gilles, Dana Point, both of Calif.

[73] Assignee: Alessi Industries, Inc., Irvine, Calif.

[21] Appl. No.: 734,899

[22] Filed: May 16, 1985

[51] Int. Cl.$^4$ .......................... G02B 21/26; B23Q 3/08
[52] U.S. Cl. ........................................ 350/531; 269/22
[58] Field of Search ........................ 350/255, 530-531; 379/3; 269/21-22, 58, 71

[56] References Cited

U.S. PATENT DOCUMENTS

| | | | |
|---|---|---|---|
| 2,003,387 | 6/1935 | Ott | 350/530 |
| 3,166,997 | 1/1965 | Barcia et al. | 350/255 |
| 3,295,803 | 1/1967 | Webb | 248/178 |
| 3,460,822 | 8/1969 | Link | 279/3 |
| 3,508,835 | 4/1970 | Ware | 350/521 |
| 3,680,947 | 8/1972 | Wanesky | 350/530 |
| 3,794,404 | 2/1974 | Wanesky | 350/320 |
| 4,017,793 | 4/1977 | Haines | 269/21 |
| 4,404,724 | 9/1983 | Christ et al. | 308/5 R |
| 4,448,403 | 5/1984 | Riessland et al. | 279/3 |
| 4,477,157 | 10/1984 | Gaul | 350/532 |
| 4,511,212 | 4/1985 | Tanaka | 350/255 |

FOREIGN PATENT DOCUMENTS

| | | | |
|---|---|---|---|
| 128733 | 8/1983 | Japan | 350/530 |
| 2134665 | 8/1984 | United Kingdom | 350/255 |

OTHER PUBLICATIONS

Pasello, R., "Micro Displacement System for Automatic Searching of Microscope Focal Plane", IBM Tech. Disc. Bull. 1-1985, pp. 4980-4981.

*Primary Examiner*—William H. Punter
*Attorney, Agent, or Firm*—Emrich & Dithmar

[57] ABSTRACT

A chuck assembly is adapted to be mounted on the positioning assembly of a microscopic test device for effecting precise repeatable vertical movement of the object under test with negligible incidental movement of any other type. A triangular member fixed with respect to the positioning assembly is received in a circular recess in the upper surface of a housing. An annular projection on the bottom of the triangular member is disposed in an annular cavity in the housing, with a sealing gasket therebetween. The bottom of the cavity is coupled to an associated source of compressed air. A thin flat flexible metal disc overlies the triangular member and is fixed thereto centrally thereof, the periphery of the disc being fixedly clamped between the housing and a retaining ring. A top plate is secured to the housing. The housing, retaining ring and top plate form a unit which is vertically movable with respect to the fixed triangular member, being biased upwardly by compression springs between the housing and retaining ring and being driven downwardly by introduction of compressed air to the groove. The flexible disc limits any incidental non-vertical movement to less than 1 micron.

23 Claims, 11 Drawing Figures

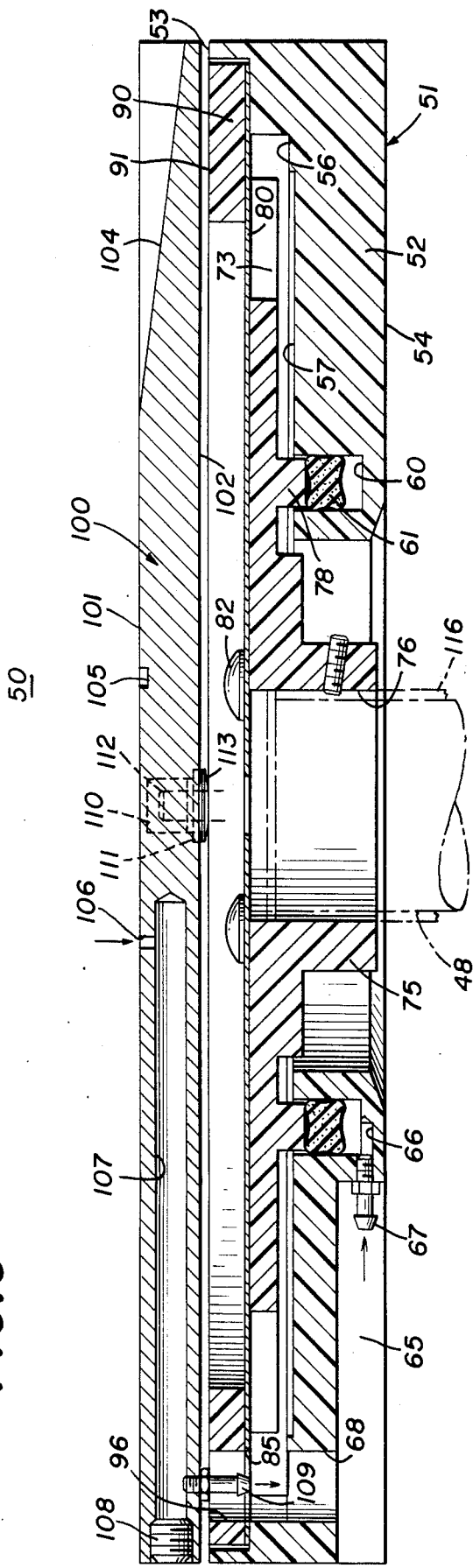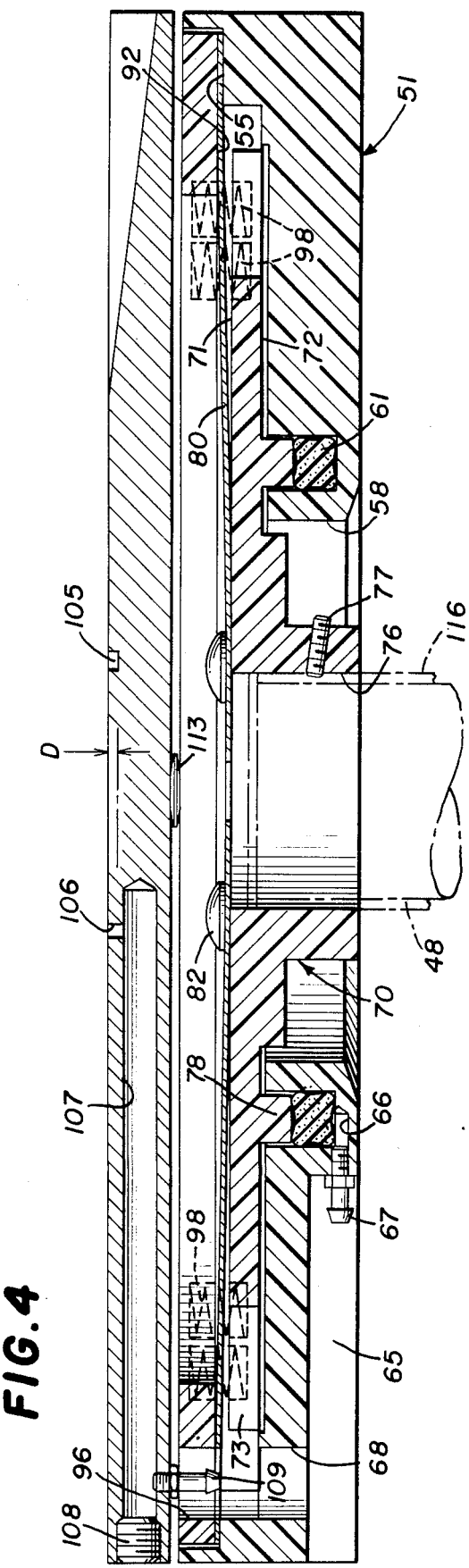

MOTION CONTROL APPARATUS FOR PRECISE REPEATABLE POSITIONING

BACKGROUND OF THE INVENTION

The present invention relates to motion control apparatus and particularly apparatus for controlling small movements of objects with microscopic precision. The invention has particular application in microscopic test and inspection devices, such as that used for testing integraed circuit semi-conductor devices or the like.

Microscopic test and inspection devices typically include a base on which is mounted a microscope, a positioning assembly for supporting and positioning an object under test in the field of view of the microscope, and one or more test probes. The test probes are commonly mounted on a platen which is capable of limited vertical movement. The positioning assembly for the viewed object is capable of X, Y, Z and rotational movements and carries thereon a chuck which has a support surface on which is seated the object under test, such as an integrated circuit in wafer or packaged form.

In integrated circuits, the circuit conductors or other test points which must be contacted by the test probes are extremely minute, having dimensions as small as less than 1 micron. Therefore, the test probes must be positioned with respect to the integrated circuits with extreme accuracy, since contact of the test probe with an unintended part of the integrated circuit could severely damage the circuit or the entire wafer. While this precise positioning can be readily accomplished on the initial positioning of the test probes, it frequently becomes necessary during a test operation to lower the integrated circuit from the predetermined test position contacting the probes, and then return the integrated circuit to the predetermined test position. This must be done with extreme accuracy. In other words, the parts must undergo a vertical separation and repositioning movement without any significant incidental X, Y or rotational movement. This is a significant problem, since all bearings must, of necessity for manufacture, include some irregularities or clearances to permit movement and, therefore, some incidental extraneous movement is unavoidable.

Prior test devices have attempted to solve this problem by the use of precision bearings with extremely close tolerances, but even by the use of such bearings it has been impossible to limit extraneous movement to less than several microns. This degree of precision is inadequate in state-of-the-art integrated circuits, where resolution to less than 1 micron is necessary.

Furthermore, prior motion control devices have been relatively bulky, presenting a high profile, which increases the overall height of the positioning assembly and, therefore, the height of the microscope, to an extent which makes the device difficult for someone to use while sitting in a chair. Also, undesirable vibrations transmitted from the supporting medium are amplified through the height of the positioning assembly.

SUMMARY OF THE INVENTION

It is a general object of the present invention to provide a motion control apparatus which avoids the disadvantages of prior devices while affording additional structural and operating advantages.

An important object of the invention is the provision of a motion control apparatus which permits controlled movement along one path while effectively preventing incidental movement along any other path.

In connection with the foregoing object, it is another object of the invention to provide a motion control apparatus of the type set forth, which limits extraneous movement to less than 1 micron.

Another object of the invention is the provision of a motion control apparatus of the type set forth which is of simple and economical construction.

In connection with the foregoing objects, it is another object of the invention to provide a motion control apparatus of the type set forth, which provides extreme accuracy without the use of bearings.

Still another object of the invention is the provision of a motion control apparatus of the type set forth, which is of compact, low-profile construction.

Yet another object of the invention is the provision of a motion control apparatus of the type set forth which can be remotely operated.

In connection with the foregoing objects, it is another object of the invention to provide a microscopic test device which incorporates motion control apparatus of the type set forth.

These and other objects of the invention are attained by providing motion control apparatus for accommodating motion parallel to a predetermined axis while preventing incidental motion, the apparatus comprising: fixed means, movable means, and a control member disposed perpendicular to the predetermined axis and fixedly secured to each of the fixed and movable means for supporting the movable means on the fixed means, the control member being flexible in directions parallel to the predetermined axis and being rigid in all other directions to accommodate movement of the movable means with respect to the fixed means only parallel to the predetermined axis.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 3 is a further enlarged view in vertical section, taken along the line 3—3 in FIG. 2, and illustrating the chuck assembly in its lowered position;

FIG. 4 is a view similar to FIG. 3, illustrating the chuck assembly in its normal raised position;

DESCRIPTION OF THE PREFERRED EMBODIMENT

Figure 1:
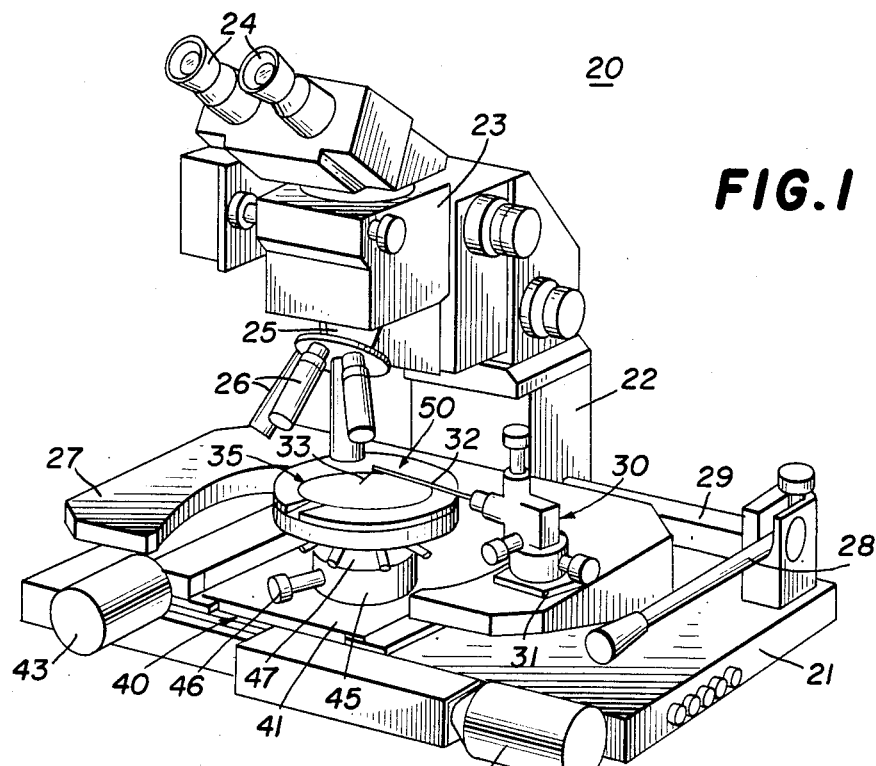
FIG. 1 is a perspective view of a microscopic test device having a chuck assembly which incorporates the motion control apparatus of the present invention.
Figure 2:
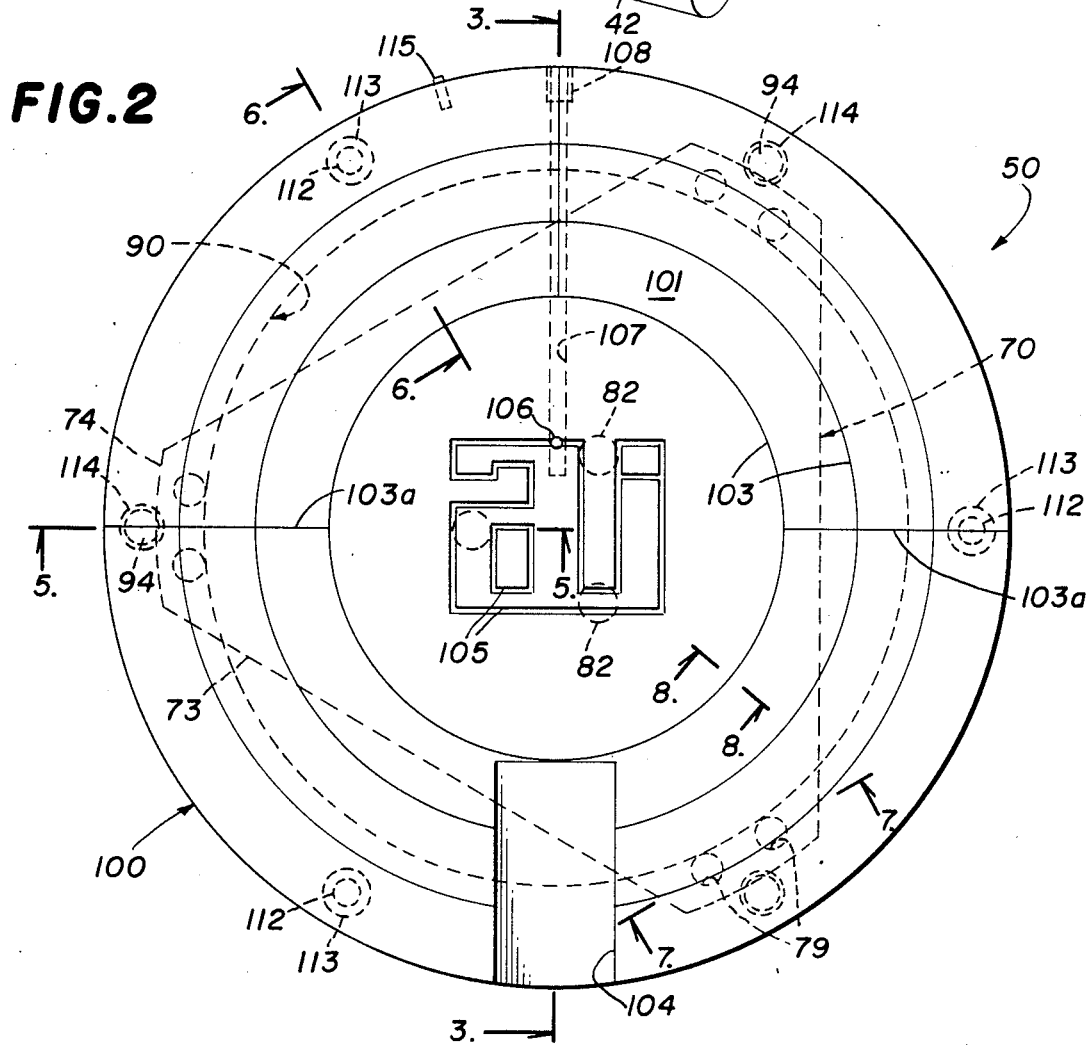
FIG. 2 is an enlarged top plan view of the chuck assembly of FIG. 1.

Referring to FIG. 1, there is illustrated a microscopic test station, generally designated by the numeral 20, utilizing the present invention. The microscopic test station 20 is generally of the type sold by Alessi, Inc. under the designation REL-4100, but it will be appreciated that the present invention could be used with various other types of microscopic test and/or inspection devices.

The microscopic test station 20 includes a flat, rectangular base 21 on which is mounted an upstanding pedestal 22, carrying at its upper end a microscope 23. The microscope 23 includes two eyepieces 24 and a turret 25 which rotatably carries a plurality of objective lenses 26 for rotation into position for viewing an object supported above the base 21. Also carried by the base 21 is a generally horseshoe-shaped platen 27 which is vertically movable over a short distance by means of a control lever 28 and shaft 29. Carried on the platen 27 are one or more test probe positioners 30 (one illustrated). The test probe positioner 30 includes a base 31 and an elongated horizontal arm 32 which extends inwardly to a position beneath the objective lenses 26, the arm 32 being provided at its distal end with a probe contact tip 33 for making electrical contact with an object under test, such as an integrated circuit which may be formed on a semiconductor wafer 35.

Also mounted on the base 21 is a positioning assembly 40, which includes a flat, rectangular stage 41 capable of horizontal movements in X and Y directions through the operation of an X-control 42 and a Y-control 43, respectively. Mounted on the stage 41 and projecting vertically upwardly therefrom is a rotational cylinder 45 having a radially outwardly extending handle 46 for manual rotation thereof. The handle 46 may also carry a locking mechanism for locking the cylinder 45 in any predetermined angular position thereof. Carried by the rotational cylinder 45 is an elevator ring 47 with a plurality of radially outwardly extending handles to facilitate manual rotation thereof. The elevator ring 47 is coupled to a screw mechanism (not shown) for effecting vertical movement of a vertical shaft 48 (see FIGS. 3 and 4) in response to rotation of the elevator ring 47. The shaft 48 is also coupled to the rotational cylinder 45 for rotation therewith in a known manner. Thus, it will be appreciated that the positioning assembly 40 permits X, Y, Z and rotational movement of objects carried thereon, all in a known manner.

Figure 5:
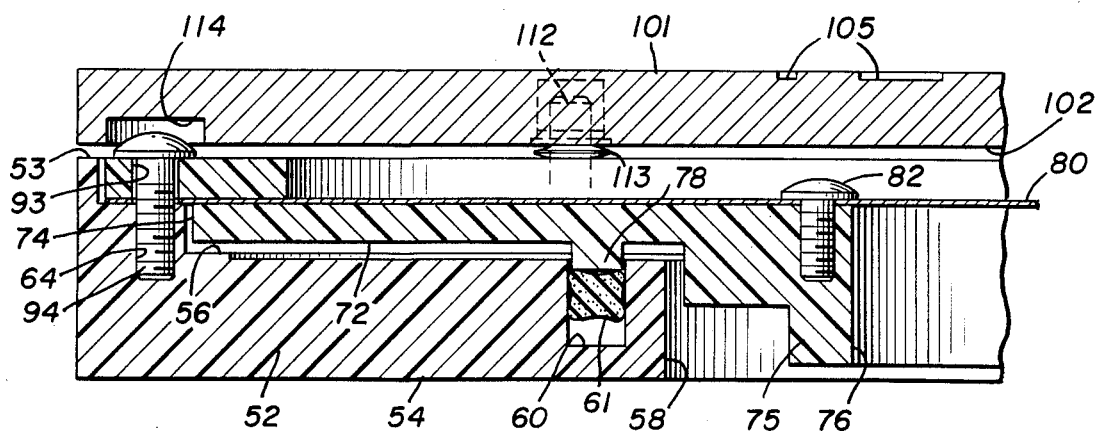
FIG. 5 is an enlarged fragmentary view in vertical section, taken along the line 5—5 in FIG. 2.

Mounted on the shaft 48 is a chuck assembly 50 constructed in accordance with and embodying the features of the present invention, the chuck assembly 50 being adapted to support thereon an object under test, such as the wafer 35. Referring now to FIGS. 2 through 11, the chuck assembly 50 includes a movable assembly 51 (FIGS. 3, 4, 6, 7 and 9) supported on a fixed plate 70 for movement with respect thereto by means of a control disc 80. The movable assembly 51 includes a housing 52, a retainer or pressure plate 90 and a top plate 100. The housing 52 is circularly cylindrical in shape and has parallel top and bottom surfaces 53 and 54. The top surface 53 is recessed to define, in radially inwardly and downwardly stepped relationship, an annular upper surface 55 (FIG. 4), an annular intermediate surface 56 (FIG. 3) and a circular lower surface 57, the surfaces 55-57 all being substantially parallel to the top surface 53. Extending centrally through the housing 52 from the lower surface 57 to the bottom surface 54 is a circular through bore 58 (FIGS. 4 and 5).

Formed in the lower surface 57 coaxially with the bore 58 and adjacent thereto is an annular cavity or groove 60, substantially rectangular in transverse cross section, in which is disposed an annular sealing gasket 61, which preferably has a generally four-lobed shape in transverse cross section. The gasket 61 may be formed of any suitable flexible and resilient material, such as rubber or the like, and is dimensioned to be press-fitted into the groove 60 in fluid-tight sealing relationship with the side walls thereof.

Extending through the housing 52 parallel to the axis thereof between the upper surfaces 55 and the bottom surface 54 are a plurality of equiangularly spaced-apart through bores 62 (FIGS. 6 and 11), preferably three in number each of the bores 62 having a counterbore 63 in the bottom surface 54, for receiving associated fasteners, as will be explained more fully below. Also formed in the upper surface 55 are three equiangularly spaced-apart, internally threaded bores 64, alternating with the bores 62, for receiving other fasteners (see FIGS. 5 and 11). Formed in the bottom surface 54 and extending radially from the outer perimeter thereof part way to the through bore 58 is a pneumatic access notch 65 (see FIGS. 3, 4, and 11). A short, radially extending bore 66 provides communication between the notch 65 and the bottom of the annular groove 60, a pneumatic fitting 67 being threadedly engaged in the outer end of the bore 66 and projecting radially into the access notch 65 for coupling to an associated source of pressurized fluid, such as compressed air. Also communicating with the access notch 65 is a circular access opening 68 which extends upwardly to the intermediate surface 56 parallel to the axis of the housing 52, for a purpose to be explained more fully below.

The chuck assembly 50 also includes a generally triangular fixed plate 70 (FIGS. 4, 7, 10 and 11) which is adapted to be fixedly secured to the shaft 48. More particularly, the fixed plate 70 has parallel top and bottom surfaces 71 and 72 and is substantially in the shape of an equilateral triangle, having straight side edges 73 and rounded corner edges 74 (FIG. 11) which lie along a common circle having a diameter very slightly less than the outer diameter of the intermediate surface 56. Projecting downwardly from the bottom surface 72 coaxially with the rounded corner edges 74 is a cylindrical hub 75 defining a through bore 76 (FIGS. 3 and 4) through the fixed plate 70. In use, the hub 75 fits down over the upper end of the shaft 48, being fixedly secured in place by set screws 77 which extend through internally threaded bores in the hub 75. Also depending from the bottom surface 72 coaxially with the hub 75 is an annular projecting portion 78, which is dimensioned to be received in the annular groove 60 in the housing 52, as will be explained more fully below. Formed in the top surface 71, respectively adjacent to the rounded corner edges 74, are three pairs of circular spring sockets 79 (see FIGS. 2, 7 and 10).

Figure 6:
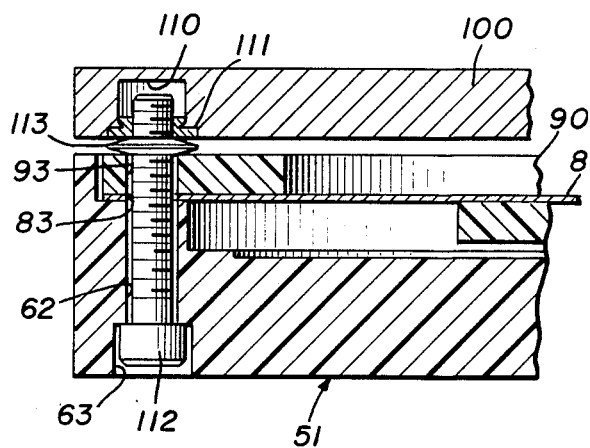
FIG. 6 is an enlarged fragmentary view in vertical section, taken along the line 6—6 in FIG. 2.
Figure 7:
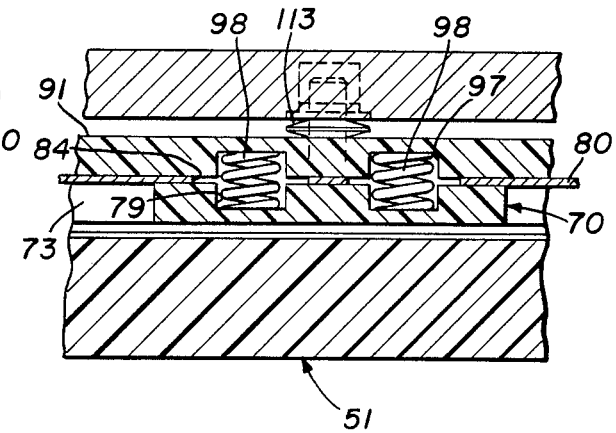
FIG. 7 is an enlarged fragmentary view in vertical section, taken along the line 7—7 in FIG. 2.
Figure 8:
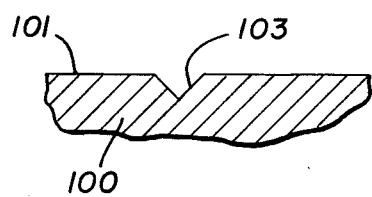
FIG. 8 is a further enlarged fragmentary view in vertical section, taken along the line 8—8 in FIG. 2.
Figure 9:
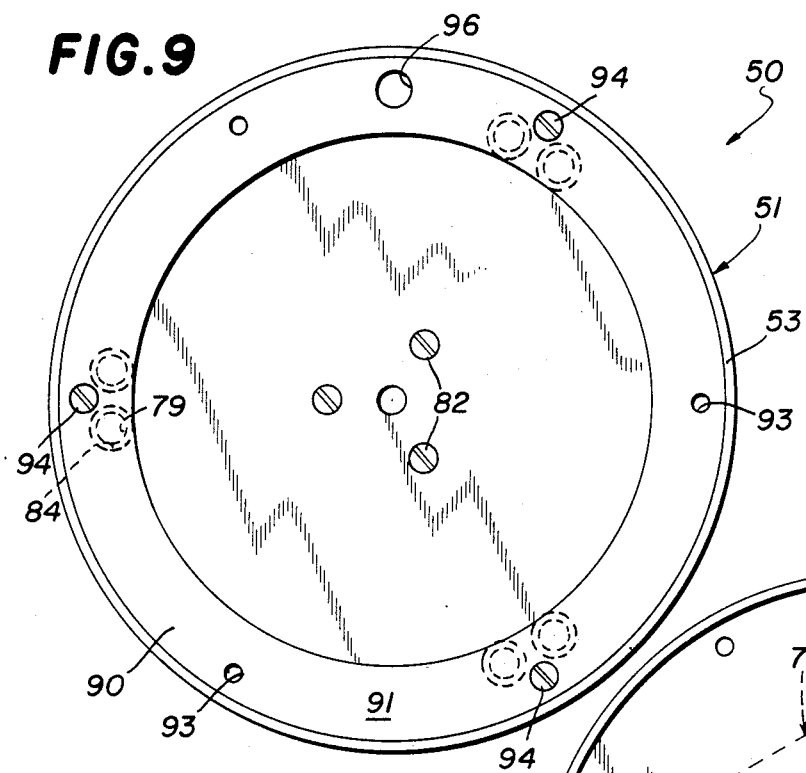
FIG. 9 is a reduced top plan view of the chuck assembly of FIG. 2, with the top plate removed.
Figure 10:
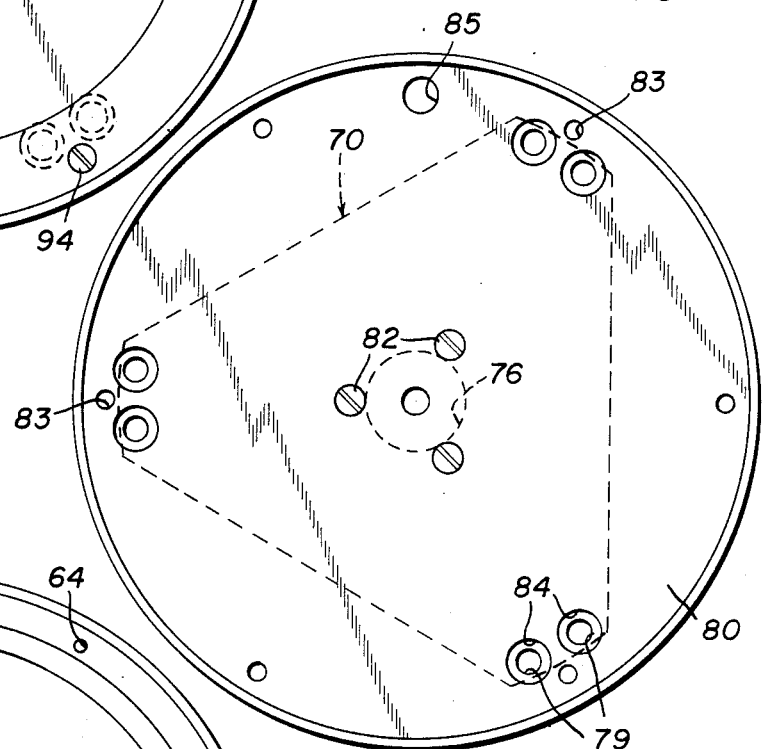
FIG. 10 is a view similar to FIG. 9, with the retaining ring also removed.
Figure 11:
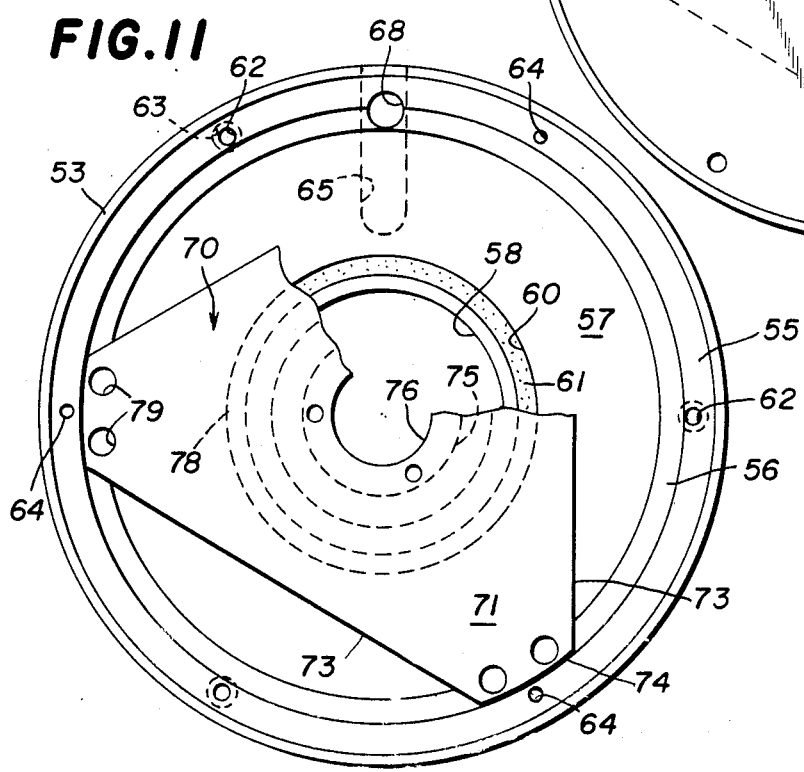
FIG. 11 is a view similar to FIG. 10, with the control disc also removed.

Overlying the fixed plate 70 is the circular control disc 80, formed of a thin sheet of metal, so as to be vertically flexible. The control disc 80 has a diameter very slightly less than the outer diameter of the annular upper surface 55 of the housing 52, and is fixedly secured to the top surface 71 of the fixed plate 70 by three equiangularly spaced-apart mounting screws 82, which are threadedly engaged with the fixed plate 70 closely adjacent to the through bore 76. Extending through the control disc 80 adjacent to the outer periphery thereof are six equiangularly spacedapart circular openings 83 (FIGS. 6 and 10). Also formed through the control disc 80, respectively adjacent to alternate ones of the openings 83, are three pairs of larger circular openings 84 (FIGS. 7, 9 and 10), which are respectively substantially coaxial with the spring sockets 79. A circular opening 85 (FIGS. 3 and 10) is also formed through the control disc 80 for a purpose to be explained below.

In use, after the control disc 80 has been mounted thereon, the fixed plate 70 is seated in the housing 52 with the portions of the fixed plate 70 adjacent to the rounded corner edges 74 resting upon the intermediate surface 56 (see FIG. 11), and with the hub 75 extending downwardly through the bore 58 in the housing 52. The peripheral portion of the control disc 80 rests upon the annular upper surface 55. The annular projecting portion 78 of the fixed plate 70 is dimensioned to be received in the annular groove 60 in engagement with the gasket 61 (see FIG. 4). The fixed plate 70 is oriented with the openings 83 in the control disc 80 respectively in registry with the bores 62 and 64 in the housing 52, so that the opening 85 of the control disc 80 is in registry with the access opening 68 in the housing 52.

The movable assembly 51 also includes a flat annular retaining or pressure plate 90, which has parallel top and bottom surfaces 91 and 92. Formed through the pressure plate 90 at equiangularly spaced-apart locations thereon are six bores 93 (see FIGS. 5 and 9), alternate ones of which receive screws 94. More particularly, in use, the pressure plate 90 is fitted over the control disc 80, the screws 94 being received through aligned ones of the openings 83 in the control disc 80 and being threadedly engaged in the internally threaded bores 64, securely to fasten the pressure plate 90 to the annular upper surface 55 of the housing 52, and to securely clamp therebetween the peripheral portion of the control disc 80. The pressure plate 90 also has an opening 96 therethrough (FIGS. 3, 4 and 9) disposed in registry with the opening 85 in the control disc 80.

Formed in the bottom surface 92 of the pressure plate 90 are three pairs of spring sprockets 97, which, in use, respectively face the spring sockets 79 in the fixed plate 70, in registry therewith. Each spring socket 97 cooperates with its facing spring socket 79 to seat therebetween a corresponding one of six helical compression springs 98 (see FIG. 7). Thus, it will be appreciated that the springs 98 tend resiliently to urge the pressure plate 90 and the housing 52 secured thereto upwardly with respect to the fixed plate 70 to a normal raised position, illustrated in FIG. 4. The springs 98 cooperate with the source of compressed air and the groove 60 and the gasket 61 to provide motive means for the pressure plate 90 and the housing 52, as explained more fully below. In the raised position the intermediate surface 56 of the housing 52 bears against the bottom surface 72 of the fixed plate 70, and the outer peripheral portion of the control disc 80 is deflected slightly above the tope surface 71 of the fixed plate 70. The thickness of the pressure plate 90 is such that it nests completely within the housing 52 so as not to project above the top surface 53 thereof.

The movable assembly 51 also includes a solid cylindrical top plate 100 having parallel circular top and bottom surfaces 101 and 102. Formed in the top surface 101 are a plurality of concentric, circular scribe grooves 103 and equiangularly spaced-apart radial scribe grooves 103a (see FIGS. 2 and 8), each being generally V-shaped in transverse cross section, the scribe grooves being useful for accurate positioning of an object under test, such as the wafer 35, on the top plate 100. Formed in the top surface 101 and extending radially inwardly from the outer perimeter thereof is an inclined access notch 104 (FIGS. 1 and 2) to facilitate lifting thin objects, such as the wafer 35, from the top plate 100.

Also formed in the top surface 101 centrally thereof is an irregular vacuum groove 105, which is arbitrarily arranged to outline the logo of applicant's assignee, but which may be in any desired pattern (see FIGS. 2-5). Communicating with the vacuum groove 105 is a vertical leg portion 106 of an elongated horizontal bore 107 extending radially into the top plate 100 and closed at the outer end thereof by a threaded plug 108. Threadedly engaged in a bore in the bottom surface 102 of the top plate 100 communicating with the bore 107 is a pneumatic fitting 109, which extends vertically downwardly from the bottom surface 102 (see FIGS. 3 and 4).

Also formed in the bottom surface 102 are three equiangularly spaced-apart circular recesses 110, each having fitted therein at the outer end thereof a threaded nut 111 for threaded engagement with an associated adjusting screw 112. Respectively associated with the nuts 111 are three resilient spacers 113, such as planar washers, for respectively receiving the associated screws 112 therethrough (FIGS. 3-7).

The top plate 100 has an outer diameter substantially equal to that of the housing 52 and overlies it in use. More particularly, the top plate 100 is oriented so that the pneumatic fitting 109 projects downwardly through the opening 96 in the pressure plate 90 for coupling to an associated source of vacuum, access for this purpose being afforded by the access opening 68 in the housing 52 and the access opening 85 in the control disc 80. In this orientation, the recesses 110 will be aligned with the bores 62, the spacers 113 being disposed between the top plate 100 and the pressure plate 90. The adjusting screws 112 are inserted upwardly through the bores 62, as illustrated in FIG. 6, and through the aligned openings 83 in the control disc 80 and the bores 93 in the pressure plate 90, thence through the spacers 113 into threaded engagement with the nuts 111. In this manner, the top plate 100 is fastened to the pressure plate 90 and to the housing 52 to form the movable assembly 51 for movement as a unit, but is spaced a slight distance above the pressure plate 90 by the spacers 113. The screws 112 and nuts 111 cooperate with the spacers 113 to permit adjustment of the inclination of the top plate 100 so as to assure that, in use, the top surface 101 thereof is parallel to the plane of X-Y travel of the stage 41.

There may also be formed in the bottom surface 102 a plurality of recesses 114 for respectively accommodating the heads of the screws 94 (See FIG. 5). The top plate 100 is preferably also provided in the side edge thereof with a radially inwardly extending pin jack 115 (FIG. 2) to receive an associated plug (not shown) for applying an electrical potential to the top plate 100. In this regard, an electrically insulating sleeve 116 (FIG. 3) may be provided on the shaft 48 to electrically isolate the chuck assembly 50 from the remainder of the test station 20.

When the chuck assembly 50 has been assembled in the manner just described, it can be mounted, as a unit, on the shaft 48 and is readily interchangeable with other chuck assemblies. In a constructional model of the invention, the housing 52, the fixed plate 70 and the pressure plate 90 are all formed of anodized aluminum, while the control disc 80 and the top plate 100 are formed of stainless steel. The top plate 100 may be gold plated to improve electrical conductivity. Preferably, the shaft 48 includes insulating means (not shown) for electrically isolating the chuck assembly 50 from the positioning assembly 40.

The operation of the chuck assembly 50 will now be described. It will be appreciated that when the chuck assembly 50 is mounted in place on the shaft 48, the fixed plate 70 is fixed with respect to the shaft 48, which is in turn fixed with respect to the base 21, since the positioning assembly 40 will be locked in position once the wafer 35 has been moved to the desired viewing position. The movable assembly 51 is supported on the fixed plate 70 by the control disc 80. The wafer 35 or other object under test is centered on the top surface 101 of the top plate 100 and the vacuum source is energized to securely hold the wafer 35 in place by suction.

Normally, the movable assembly 51 is in a raised position, illustrated in FIG. 4, with the intermediate surface 56 of housing 52 bearing against the bottom surface 72 of the fixed plate 70 under the urging of the compression springs 98, as explained above. With the aid of the microscope 23, the probe contact tips 33 are positioned in contact with the desired portions of the integrated circuit on the wafer 35. It will be appreciated that the probe positions 30 are adjustable in several dimensions for this purpose.

When it is desired to retract the integrated circuit from the contact tips 33, compessed air is applied to the annular groove 60, by the use of suitable valve means (not shown). Because of the seal afforded by the gasket 61, this pressurization of the annular groove 60 forces the housing 52 downwardly with respect to the fixed plate 70, thereby pulling the entire movable assembly 51 downwardly to a lowered position, illustrated in FIG. 3. This downward movement of the movable assembly 51 is accommodated by the vertical flexibility of the control disc 80.

However, it is a fundamental aspect of the invention that the control disc 80 effectively prevents any other movement of the movable assembly 51 with respect to the fixed plate 70. More particularly, it will be appreciated that, because the control disc 80 is fixedly secured centrally thereof to the fixed plate 70 and is fixedly secured at the periphery thereof to the movable assembly 51, it operates as a rigid beam in all directions except the vertical, thereby effectively preventing any horizontal or rotational movement of the movable assembly 51 with respect to the fixed plate 70. Thus, when the pressure is removed from the annular groove 60, the movable assembly 51 will return precisely to its original raised position under the urging of the compression springs 98, with no significant horizontal or rotational deviation. It has been found that with the use of the present invention, the object under test can be repeatedly vertically moved to and from a predetermined test/viewing position with incidental horizontal and rotational movement limited to less than one micron.

It will be appreciated that during the movement of the movable assembly 51 between its raised and lowered positions, it moves only a very slight distance, designated D in FIG. 4. In the preferred embodiment of the invention, this distance is between 0.03 and 0.04 inch. This distance is more than enough to completely disengage the object under test from the probe contact tips 33, but is otherwise kept to a minimum so as to minimize stress on the control disc 80. This substantially eliminates the possibility of the control disc 80 undergoing any permanent deformation during the life of the chuck assembly 50.

A significant aspect of the present invention is that it achieves the precisely repeatable positioning function without the use of bearings, thereby greatly simplifying the construction and minimizing the cost of the device, as well as permitting greatly increased accuracy. Another advantage of the invention is that it provides a relatively thin or low-profile construction, thereby limiting the overall height of the positioning assembly from the base 21 to the eyepieces 24 of the microscope 23. This has ergonomic significance, since it permits construction of a tabletop test station which is low enough to permit comfortable operation by a user sitting in a chair. Also this low profile minimizes amplification of vibrations from the supporting medium for the test station 20.

Furthermore, it will be appreciated that the normal rest position of the movable assembly 51 is in its raised position. Thus, when the chuck assembly 50 is energized with pressurized air, the movable assembly 51 will move downwardly, so as to prevent accidental engagement of the object under test with the probe contact tips 33 in the event that the air valve is open when the pressurized source of air is connected.

From the foregoing, it can be seen that there has been provided an improved motion control apparatus which is characterized by simple and economical construction, ease of use, extreme accuracy, safety and low profile construction.

We claim:

1. Motion control apparatus for accommodating motion parallel to a predetermined axis while preventing incidental motion, said apparatus comprising: fixed means having a flat upper surface, movable means, motive means coupled to said movable means for effecting movement thereof, and a single control member independent of said motive means disposed perpendicular to said predetermined axis, said control member overlying said flat surface of said fixed means for supported engagement therewith and being fixedly secured thereto centrally thereof at a first attachment location, said control member having a peripheral portion extending laterally a slight distance beyond the periphery of said flat surface of said fixed means and being fixedly secured to said movable means at a second attachment location, said control member being continuous and uninterrupted between said first and second attachment locations for supporting said movable means on said fixed means, said control member being flexible in directions parallel to said predetermined axis and being rigid in all other directions to accommodate movement of said movable means with respect to said fixed means only parallel to said predetermined axis.

2. The motion control apparatus of claim 1, wherein said predetermined axis is disposed vertically.

3. The motion control apparatus of claim 1, wherein said control member comprises a thin flat member defining a plane perpendicular to said predetermined axis, said control member being deflectable into and out of said plane to accommodate movement of said movable means.

4. The motion control apparatus of claim 3, wherein said control member comprises a flat circular disc.

5. The motion control apparatus of claim 4, wherein said control member is secured centrally thereof to said fixed means and is secured at spaced-apart locations along the periphery thereof to said movable means.

6. The motion control apparatus of claim 3, wherein said control member comprises a thin metal plate.

7. The motion control apparatus of claim 1, wherein said motive means includes bias means for resiliently urging said movable means toward movement in a first direction parallel to the predetermined axis, and drive means coupled to said movable means for effecting movement thereof in a direction opposite to said first direction against the urging of said bias means.

8. The motion control apparatus of claim 7, wherein said drive means is fluid-actuated.

9. The motion control apparatus of claim 1, wherein said apparatus includes no bearings.

10. Motion control apparatus for accommodating motion parallel to a predetermined axis while preventing incidental motion, said apparatus comprising: fixed means having a projection extending therefrom parallel to said predetermined axis, movable means having a cavity therein, a control member disposed perpendicular to said predetermined axis and fixedly secured to each of said fixed and movable means for supporting said movable means on said fixed means in a supported condition with said projection disposed in said cavity, said control member being flexible in directions parallel to said predetermined axis and being rigid in all other directions to accommodate movement of said movable means with respect to said fixed means only parallel to said predetermined axis, conduit means communicating with said cavity and adapted to be coupled to an associated source of pressurized fluid, and means effecting a fluid-tight seal between said projection and said movable means, whereby introduction of pressurized fluid into said cavity effects movement of said movable means parallel to said predetermined axis.

11. The motion control apparatus of claim 10, wherein said projection and said cavity are annular in shape.

12. The motion control apparatus of claim 11, wherein said projection and said cavity are coaxial with said predetermined axis.

13. The motion control apparatus of claim 10, wherein said predetermined axis is disposed vertically.

14. The motion control apparatus of claim 10, wherein said fixed means includes a relatively flat plate with said projection extending from one side thereof.

15. The motion control apparatus of claim 14, wherein said flat plate is generally triangular in shape.

16. The motion control apparatus of claim 14, wherein said movable means includes a housing having a circular recess therein for receiving said flat plate completely therein with said one side of said support member facing the inner end of said recess, said housing having a peripheral portion surrounding said recess, said control member being fixedly secured to said peripiheral portion of said housing.

17. The motion control apparatus of claim 16, and further including an annular ring fixedly secured to said peripheral portion of said housing and extending radially inwardly therefrom a distance sufficient to overlap said flat plate, compression spring means disposed between said ring and the overlapped portion of said flat plate for resiliently urging said housing toward a normal rest position engaging said one side of said flat plate.

18. The motion control apparatus of claim 14, wherein said flat plate has a central hub portion adapted to be fixedly secured to an associated fixed support.

19. In a microscopic test device including a microscope and a positioning assembly for supporting and positioning objects under test in the field of view of the microscope, the improvement comprising: motion control apparatus to accommodate vertical movement of the object under test while preventing any other type of movement thereof, said motion control apparatus including fixed means carried by the positioning assembly and immovable with respect thereto and having a flat upper surface, movable means adapted for carrying an object under test and movable with respect to said fixed means, motive means coupled to said movable means for effecting movement thereof, and a single control member independent of said motive means disposed horizontally, said control member overlying said flat surface of said fixed means for supported engagement therewith and being fixedly secured thereto centrally thereof at a first attachment location, said cotnrol member having a peripheral portion extending laterally a slight distance beyond the periphery of said flat surface of said fixed means and being fixedly secured to said movable means at a second attachment location, said control member being continuous and uninterrupted between said first and second attachment locations for supporting said movable means on said fixed means, said control member being flexible vertically and being rigid in all other directions to accommodate only vertical movement of said movable means with respect to said fixed means.

20. The microscopic test device of claim 19, wherein said motive means includes bias means resiliently urging said movable means vertically upwardly, and drive means coupled to said movable means for effecting vertical downward movement thereof against the urging of said bias means.

21. The microscopic test device of claim 19, wherein said movable means includes a top plate overlying said fixed means and having a flat support surface adapted to receive the viewed object thereon, and adjustment means coupled to said top plate for leveling said support surface.

22. The microscopic test device of claim 21, and further including vacuum means in said top plate for holding the object under test on said support surface.

23. The microscopic test device of claim 22, wherein said top plate is electrically conductive, and further including electrical contact means on said top plate adapted to be coupled to an associated source of an electrical potential.

* * * * *